United States Patent
Freiman

[11] 4,012,503
[45] Mar. 15, 1977

[54] COATING COMPOSITIONS USED TO CONTROL BARNACLES

[75] Inventor: Aaron Freiman, Brooklyn, N.Y.

[73] Assignee: M & T Chemicals Inc., Greenwich, Conn.

[22] Filed: June 11, 1975

[21] Appl. No.: 586,074

Related U.S. Application Data

[63] Continuation-in-part of Ser. No. 355,403, April 30, 1973, abandoned, which is a continuation-in-part of Ser. No. 142,041, May 10, 1971, abandoned.

[52] U.S. Cl. .............. 424/145; 106/15 R; 424/249; 424/288; 71/67
[51] Int. Cl.$^2$ ............................ A01N 11/00
[58] Field of Search ......... 424/145, 288, 249; 106/15 AF

[56] References Cited
UNITED STATES PATENTS 3,214,279  10/1965  Scoh ..................... 106/1 J

FOREIGN PATENTS OR APPLICATIONS 917,629  2/1963  United Kingdom

OTHER PUBLICATIONS

Chemical Abstracts, 60:8578g, (1964).
Chemical Abstracts, 58:9328f–9329a, (1963).
Pesticide Index, Frear, 4th Ed., p. 42.
Pesticide Index, Frear, 4th Ed., p. 51.

*Primary Examiner*—Leonard Schenkman
*Attorney, Agent, or Firm*—Robert P. Auber; Kenneth G. Wheeless; Robert Spector

[57] ABSTRACT

Toxicant compositions containing the combination of tri-n-butyltin fluoride with zinc oxide and specified substituted triazines effectively inhibit the development of marine organisms, including barnacles and algae, that are responsible for fouling. These compositions are particularly useful as the active component in antifouling coatings.

2 Claims, No Drawings

COATING COMPOSITIONS USED TO CONTROL BARNACLES

BACKGROUND OF THE INVENTION

This application relates to improved antifouling coating compositions. This application is a continuation-in-part of application Ser. No. 355,403, filed Apr. 30, 1973, and now abandoned, which is in turn a continuation-in-part of application Ser. No. 142,041 filed on May 10, 1971, and now abandoned.

The organisms responsible for fouling can be classified into two major categories. Shelled organisms, also referred to as "hard-fouling" types, include barnacles, tube worms, encrusting bryozoans and mollusks. Organisms without a shell, referred to as "soft-fouling" types, include algae such as seaweed, tunicates, filamentous bryozoans, and hydroids.

Fouling of a ship's hull by any of the aforementioned organisms is most undesirable since it increases both fuel consumption and maintenance costs resulting from the frequent dry docking required to clean and repair the submerged portions of the hull.

Coatings conventionally employed to protect submerged surfaces from the attachment and growth of fouling organisms usually contain a toxicant and a carrier consisting, at least in part, of a rosin (a mixture of five isomeric diterpene acids, the major component being abietic acid). A film-forming synthetic polymer is often included as part of the carrier. Many coatings also contain a pigment such as titanium dioxide and one or more organic liquids.

Coatings containing one or more triorganotin compounds are efficacious with regard to eliminating or inhibiting the development of barnacles and other organisms responsible for "hard" fouling throughout the life of the coating, i.e. up to about 2 years. However, triorganotin compounds are considerably less effective in inhibiting the attachment and growth of green algae, more commonly referred to as seaweed, and other varieties of soft fouling organisms which are no less deleterious than the "hard" fouling types in their adverse effect on a vessel's consumption and maintenance requirements.

One object of this invention is to provide a novel toxicant composition suitable for incorporation into coatings and porous structural materials. The toxicant composition provides superior protection against both "hard" and "soft" fouling organisms for extended periods of time.

A second object of the present invention is to inhibit fouling of ship hulls and other structures exposed to a marine environment for relatively long periods of time, thereby reducing maintenance costs.

Another object of this invention is to provide a coating containing a synergistic combination of antifouling ingredients which are released at a substantially uniform rate over a relatively long period of time.

SUMMARY OF THE INVENTION

One aspect of the present invention concerns novel three-component toxicant compositions that effectively inhibit the attachment and development of fouling organisms, said compositions consisting essentially of 1) between 20 and 80%, based on the total weight of the composition, of tri-n-butyltin fluoride 2) between 10 and 40% by weight of a symmetrically substituted triazine of the formula

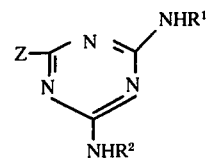

wherein $R^1$ and $R^2$ are individually selected from the group consisting of alkyl radicals containing between 1 and 4 carbon atoms and Z is selected from the group consisting of a chlorine atom and alkylthio radicals containing between 1 and 4 carbon atoms, and 3) between 10 and 40% by weight of zinc oxide.

A second aspect of this invention concerns novel antifouling coatings comprised at least in part of a film-forming synthetic vinyl polymer, rosin, one or more pigments, one or more solvents and an effective amount of the novel toxicant composition described hereinbefore.

DETAILED DESCRIPTION OF THE INVENTION

A. The Toxicant Composition

The novel toxicant compositions of this invention, i.e. the combination of tri-n-butyltin fluoride with zinc oxide and one or more suitable triazine derivatives as defined hereinbefore, resist the attachment and development of both hard- and soft- fouling organisms for extended periods of time.

In addition to effectively inhibiting algae for relatively long periods of time, the components of the present toxicant compositions appear to act synergistically with respect to inhibiting barnacle development and are, therefore, most preferred for use in antifouling coatings. As will be subsequently demonstrated, coatings incorporating the combination of tributyltin fluoride with zinc oxide and one or more of the triazines specified hereinbefore exhibit a greater resistance to barnacle development than coatings containing the triorganotin compound as the sole toxicant or in combination with zinc oxide. This activity against barnacles is unexpected in view of the very poor resistance to barnacle development exhibited by coatings containing the aforementioned triazines as the sole active toxic ingredient. This effect is not observed when the triazine is replaced with other known algicides such as methylene bisthiocyanate, $(NCS)_2CH_2$.

Suitable triazines exhibit the formula

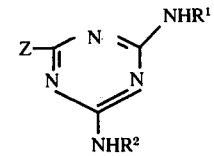

wherein $R^1$ and $R^2$ are individually selected from the group consisting of monovalent alkyl hydrocarbon radicals containing between 1 and 4 carbon atoms. Z is selected from the group consisting of chlorine atoms and alkyl thio radicals ($-SR^3$) containing between 1 and 4 carbon atoms, inclusive.

Two preferred triazines are 2-ethylamino-4-isopropylamino-6-methylthio-s-triazine, sold under the trade name of "Ametryne", and 2-chloro-4- ethylamino-6-isopropylamino-s-triazine, available under the trade name "Atrazine".

The concentration of the combined toxicants (triorganotin compound, zinc oxide and triazine) in the coating composition is between about 15 and 40%, based on the total weight of the coating formulation.

The triazine constitutes between about 1 and 15%, preferably between about 3 and 10% by weight of the coating formulation, tri-n-butyltin fluoride constitutes between 5 and 25%, preferably between 10 and 15%, and the zinc oxide constitutes between 5 and 15%, preferably between 5 and 10% by weight of the formulation. The relative amounts of these three components should be within the limits specified hereinbefore.

B. The Coating Base

The major components of the bases conventionally employed for antifouling coatings include rosin, a film-forming vinyl polymer, one or more pigments and/or extenders and suitable organic liquids for dissolving and dispersing the solid components, including the toxicant. Suitable film-forming vinyl polymers include homopolymers of acrylic esters, and vinyl halides. These monomers may be copolymerized with other suitable ethylenically unsaturated materials, e.g. vinyl esters.

Copolymers of vinyl chloride with one or more vinyl esters, e.g. vinyl acetate, are the preferred film-forming vinyl polymers. The most preferred polymer is one containing 91% by weight of vinyl chloride and 9% by weight of vinyl acetate. A portion (up to 70%) of the vinyl acetate groups may be hydrolyzed to vinyl alcohol, as in a copolymer available under the trademark VAGH.

Optimum toxicant activity is obtained when the weight of vinyl polymer is between 1.5 and 3 times the weight of the rosin.

Various pigments can be employed to increase the covering power of the coating and to achieve a desired color in the resultant composition. Preferred pigments are titanium dioxide (for white) and ferric oxide (for red paints). The volume of pigment should preferably be between about 20 and 40% of the volume of total solids, i.e. non-volatile materials, which is equivalent to the total formulation less the volume of solvents present. The non-volatile materials preferably comprise between 30 and 80% by weight, based on the total coating formulation. The amount of organic liquid employed will be dependent upon the desired viscosity of the formulation.

The present coating formulations may also include extenders, e.g. talc or other silicates and one or more thixotropic agents, e.g. montmorrilonite clays, which reduce settling of the paint while in the can and provide a degree of viscosity sufficient to retain the integrity and thickness of a wet paint film.

C. Procedure For Evaluating Antifouling Performance

The antifouling performance of both the present formulations and controls was determined by applying two coats, each 2.0–2.5 mils (5.1 − 6.4 × 10$^{-3}$ cm.) in thickness, to both sides of a fiberglass panel which had previously been sanded to obtain a roughened surface. The panels were then partially immersed in Biscayne Bay, at Miami Beach, Florida. The conditions in this area are particularly conducive to the development of fouling organisms, especially algae. The panels were secured to a raft at a location which maintained the upper one-third of each panel above the water line at all times.

The panels were withdrawn at monthly intervals, inspected and the antifouling performance of the coating was rated by observing the number of barnacles present on the most heavily fouled surface.

EXAMPLE 1

This example demonstrates the improved antifouling performance of coatings containing the present toxicants relative to coatings containing tri-n-butyltin fluoride or a combination of tri-n-butyltin fluoride and zinc oxide.

The three coating formulations evaluated exhibited the following compositions, expressed as parts by weight.

| INGREDIENTS | I | II | III |
| --- | --- | --- | --- |
| Titanium dioxide | 21.5 | 16.0 | 14.0 |
| Talc | 6.0 | 6.0 | 10.0 |
| Bentonite | 0.54 | 0.54 | 0.48 |
| Vinyl resin[1] | 9.47 | 9.47 | 8.17 |
| Rosin | 6.32 | 6.32 | 5.44 |
| Tri-n-butyltin fluoride | 12.5 | 12.5 | 12.5 |
| Triazine[2] | 0 | 0 | 5.6 |
| Zinc oxide | 0 | 7.5 | 7.5 |
| Methyl isobutyl ketone | 23.5 | 21.5 | 18.78 |
| Xylene | 20.0 | 20.0 | 17.43 |
| Methanol | 0.16 | 0.16 | 0.14 |

[1]The vinyl resin was a copolymer derived from a monomer mixture containing 91% by weight of vinyl chloride and 9% vinyl acetate. One half of the vinyl acetate residues in the polymer were hydrolyzed. [2]The triazine was 2-ethylamino-4-isopropylamino-6-methyl-thio-s-triazine.

The panel coated with formulation I (tri-n-butyltin fluoride as the sole toxicant) contained 75 barnacles on the more heavily fouled surface following a 10 month exposure. Formulation II, containing the combination of tri-n-butyltin fluoride and zinc oxide, was superior in that the test panel coated with the formulation exhibited only 25 barnacles on the more heavily fouled surface following a 10 month exposure. After 13 months the number of barnacles had increased to 45, at which time the panel was withdrawn from the water due to a heavy growth of algae. Formulation III, which contained one of the present toxicant compositions, was superior to the other two formulations tested with respect to inhibition of barnacles. Following a 13 month exposure the panel coated with this formulation exhibited only incipient barnacle formation. The numbers of barnacles observed on the more heavily fouled surface at monthly intervals up to 22 months are set forth in the following table.

Months of Exposure 10 11 12 13 14 15 16 17 18 19 20 21 22

Number of Barnacles 0 0 0 i i 10 15 20 25 40 62 63 78 i=incipient barnacle formation

EXAMPLE 2

This example demonstrates one of the preferred formulations for use with the present toxicants. It has been found that the efficacy of the present toxicants can be significantly increased when the weight ratio of vinyl resin to rosin is about 3:1, respectively.

The formulation evaluated exhibited the following composition, expressed in parts by weight.

| | |
| --- | --- |
| Titanium dioxide | 14.0 |

-continued

| | |
|---|---|
| Talc | 10.5 |
| Bentonite | 0.48 |
| Vinyl resin (as per Example 1) | 10.21 |
| Rosin | 3.1 |
| Tri-n-butyltin fluoride | 12.5 |
| Triazine (as per Example 1) | 5.6 |
| Zinc oxide | 7.5 |
| Methyl isobutyl ketone | 18.78 |
| Xylene | 17.43 |
| Methanol | 0.14 |

A panel coated with this formulation remained free of barnacles during a 25 month exposure. At the end of this period only 30% of the most highly fouled surface was covered with algae.

EXAMPLE 3

This example demonstrates that an unexpectedly high level of antifouling performance is achieved using 2-chloro-4-ethylamino-6-isopropylamino-s-triazine.
The formulation exhibited the following composition, expressed as parts by weight.

| | |
|---|---|
| Titanium dioxide | 16.0 |
| Talc | 6.8 |
| Montmorrilonite clay | 0.5 |
| Vinyl resin (as per Example 1) | 5.25 |
| Rosin | 10.5 |
| Tri-n-butyltin fluoride | 12.5 |
| Zinc oxide | 7.5 |
| Triazine | 3.7 |
| Methyl isobutyl ketone | 20.7 |
| Xylene | 20.0 |
| Methanol | 0.2 |

Following 7 months of exposure a panel coated with the formulation exhibited five barnacles on its most heavily fouled surface. By comparison, a panel coated with the same formulation but containing the triazine of the foregoing Examples 1 and 2 exhibited 43 barnacles following a 9 month exposure. A similar formulation containing only zinc oxide and the triazine of Example 1 was relatively ineffective as a barnacle inhibitor. A panel coated with this formulation was covered with over 100 barnacles following a four month exposure. The efficacy of the triazine in surpressing the attachment and growth of barnacles when used in combination with tri-n-butyltin fluoride is therefore surprising and unexpected.

What is claimed is:
1. A coating composition for inhibiting the development of barnacles on substrates exposed to a marine environment, said composition comprising 1) a carrier which in turn comprises rosin and a film-forming vinyl polymer, 2) at least one pigment, 3) at least one organic liquid for dissolving and dispersing the solid components of said composition, and 4) an effective amount of toxicant composition consisting essentially of between 10 and 15%, based on the total weight of said composition, of tri-n-butyltin fluoride, between 5 and 10% by weight of zinc oxide and between 3 and 10% by weight of a triazine

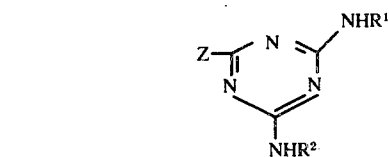

selected from the group consisting of 2-ethylamino-4-isopropylamino-6-methylthio-s-triazine and 2-chloro-4-ethylamino-6-isopropylamino-s-triazine.

2. A coating composition as described in claim 1 wherein the film-forming vinyl polymer is a copolymer of vinyl chloride with other suitable ethylenically unsaturated materials.

* * * * *